March 10, 1970   A. C. BAYNHAM ET AL   3,499,705

TRAVELLING SPOT DISPLAY DEVICE

Filed Oct. 18, 1968

A.C. Baynham
H. D. Rees
INVENTORS

BY Hall, Pollock & Vande Sande

United States Patent Office 3,499,705
Patented Mar. 10, 1970

3,499,705
TRAVELLING SPOT DISPLAY DEVICE
Alexander Christopher Baynham and Huw David Rees, Malvern, England, assignors to Minister of Technology in Her Britannic Majesty's Government of the United Kingdom of Great Britain and Northern Ireland, London, England
Filed Oct. 18, 1968, Ser. No. 768,795
Claims priority, application Great Britain, Oct. 18, 1967, 47,436/67
Int. Cl. G02f 1/28
U.S. Cl. 350—161
4 Claims

ABSTRACT OF THE DISCLOSURE

A display device includes a transparent rod along which a mechanical pulse is propagated. Modulated light is also propagated along the rod and the light released at the travelling pulse forms the travelling spot of the display.

---

The present invention relates to display devices.

There is considerable current interest in the design and development of a display system to replace the cathode ray tube in at least some of its present uses. The essentials of a commercially viable device are low cost, good brightness and a reasonably small front to back thickness, and the ability to handle colour is a great advantage. Systems suggested to date can be divided into three main groups, those using matrix display methods, those using analogue scanning with an essentially flat display and those using analogue deflection of light. Systems using analogue deflection of light and those where optical magnification is required have the disadvantage that the optical lens or mirror system is necessarily long. Present day lens or mirror systems that could give an f number anywhere near that of the electron focussing of a cathode ray tube are very expensive indeed. The need for auxiliary optics would seem to eliminate commercial viability vis à vis the cathode ray tube. Matrix display techniques are very expensive per binary digit of display, but are otherwise reasonably tractable. This leaves the flat analogue scanning systems. These systems can be subdivided into those where the domain excites light emission (where a separate intensity modulator is needed, which introduces problems with colour) and those where the domain produces light modulation, exploiting (for example) the electrooptic effect. Generally flooding the whole display with light from an auxiliary source is envisaged, but the inherent large loss of efficiency is a very severe disadvantage of such an approach to the problem. It does not seem unfair to say that at present the only technically practical systems are exorbitantly expensive compared with the cathode ray tube.

It is an object of the invention to provide a display device that overcomes some of the above disadvantages.

According to the present invention there is provided a display device including a rod made of transparent material, means for launching a light wave along the rod in a trapped mode and means for launching a mechanical pulse along the rod in such a way that light is released at the mechanical pulse.

In the present specification the expression 'mechanical pulse' means a short burst of a mechanical wave.

An embodiment of the invention will be described by way of example with reference to the drawings, in which.

Figure 1:
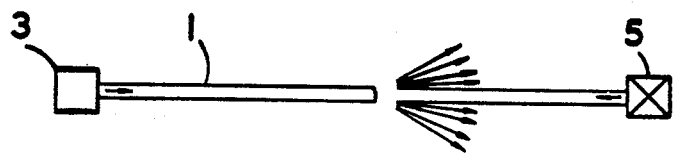
FIGURE 1 is a diagram used to explain the operation of a display device.

In FIGURE 1 there is shown a thin transparent rod 1 having disposed at one end a modulated light source 3 and at the other a mechanical wave source 5. The light source 3 is used to launch light along the rod 1 towards the mechanical source 5. A mechanical pulse (such as a sound wave or a flexing wave) is launched down the rod from the source 5 towards the light source 3. The light is propagated normally in a trapped mode, but the mechanical pulse causes a change in the refractive index of the material of the rod 1. This change in the refractive index causes the light to be no longer trapped within the rod 1 but to escape out of the rod 1. A spot of light therefore travels along the rod 1 at the velocity of the mechanical pulse (typically about 5000 metres per second, approximately the spot speed of a present day cathode ray tube). The modulation of the light spot is effected, of course, by the modulation of the light source 3.

Obviously the rod 1 must be transparent. The attenuation of the mechanical pulse must be low.

A two dimensional display may be made using a single rod bent into the form of a television scanning raster. Alternatively the system illustrated in FIGURE 2 may be used.

Figure 2:
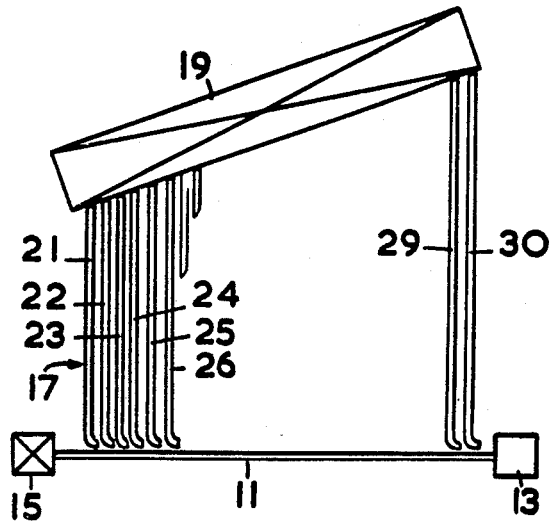
FIGURE 2 is a diagram of a display device embodying the invention.

In FIGURE 2 a thin transparent rod 11 has disposed at one end a modulated light source 13 and at the other a mechanical wave source 15. A series 17 of thin evenly spaced parallel transparent rods 21, 22, 23, 24, 25, 26 . . . 29, 30 runs at right angles to the rod 11 and each rod of the series 17 is arranged to receive the optical output of the rod 11 when the rod 11 exhibits a light spot adjacent to it. The rods 21, 22, 23, 24, 25, 26 . . . 29, 30 are of linearly graded lengths, with the rod 21 being the shortest and the rod 30 the longest. A single mechanical wave source 19 is disposed at the ends remote from the rod 11 of all the rods in the series 17.

The action of the arrangement is as follows. Light from the modulated source 13 is launched along the rod 11 towards a mechanical pulse originating at the source 15. At the front edge of the mechanical pulse the light escapes and it is arranged that as much of the escaped light as possible is transferred to the adjacent rod from the series 17. The mechanical wave source 19 is used to launch mechanical pulses together along all the rods from the series 17. The light caused to escape from the series 17 of rods forms the display. On the first sweep the source 15 and the source 19 are triggered together, producing a line scan parallel to the rod 11, if the time taken for a mechanical pulse to travel along rod 11 from the end of one rod from the series 17 to the next is the same as the time taken by a mechanical pulse to travel along a rod from the series 17 a distance equal to the difference in length between a rod from the series 17 and an adjacent rod from the series 17.

Successive mechanical pulses launched from the source 15 are delayed by increasing steps with respect to the mechanical pulses launched from the source 19, producing successive line scans parallel to the rod 11 and approaching it, whereby the whole screen is covered. It should be noted that this arrangement uses only one modulated light source and also permits most of the available light to be transferred into the sweeping spot. In this respect there is close correspondence with the cathode ray tube, but there is the added advantage that the whole device is essentially flat. Colour operation requires only the use of three monochromatic, parallel sources with independent modulation.

The light scattered out of the fibre may be scattered diffusely by means of a ground glass screen or otherwise.

The word "rod" has been used merely as an example of a linear transparent medium, and has been selected to cover any suitable medium such as a glass or crystal fibre or oxide or other structure grown on a metal or evaporated on a substrate, or a heterogeneous structure such as a transparent fibre coated with a transparent layer of different material.

An alternative mechanism for propagating a mechanical pulse down a rod utilises the acousto electric or a similar effect. In a transparent semiconductor crystal an acoustic domain (which constitutes the mechanical pulse) is initiated and sustained by a voltage applied to the ends of the crystal and moves along the crystal. The acoustic domain may cause light transmitted along the crystal to be scattered out of the crystal due to interactions occurring between the light and thhe acoustic waves in the domain. Synchronism may be maintained by using synchronising pulses to raise the voltage applied to the rod from a value just below the threshold voltage for the acoustoelectric effect to a value just above that voltage.

What we claim is:

1. A display device including a rod made of transparent material, means for launching a light wave along the rod in a trapped mode and means for launching a mechanical pulse along the rod in such a way that light is released at the mechanical pulse.

2. A display device as claimed in claim 1 and in which the means for launching a mechanical wave along the rod includes an electromechanical transducer.

3. A display device as claimed in claim 1 and in which the rod exhibits the acoustoelectric effect and the means for launching a mechanical wave along the rod includes an acoustic domain initiating and sustaining voltage supply.

4. A display device as claimed in claim 1 and including a plurality of further rods and means for launching a mechanical pulse along the plurality of further rods and in which light released from the first named rod is launched into the plurality of further rods in turn.

References Cited

UNITED STATES PATENTS

| | | | |
|---|---|---|---|
| 3,174,044 | 3/1965 | Tien | 350—161 X |
| 3,184,539 | 5/1965 | Thomas | 350—160 X |

RODNEY D. BENNETT, Jr., Primary Examiner

R. E. BERGER, Assistant Examiner

U.S. Cl. X.R.

178—7.3, 7.6; 340—380